United States Patent
Powell et al.

(10) Patent No.: US 12,154,367 B2
(45) Date of Patent: Nov. 26, 2024

(54) FULL BODY POSE ESTIMATION THROUGH FEATURE EXTRACTION FROM MULTIPLE WEARABLE DEVICES

(71) Applicant: Apple Inc., Cupertino, CA (US)

(72) Inventors: Victoria M. Powell, San Francisco, CA (US); Wesley W. Zuber, Mountain View, CA (US); Miki Olivia Hansen, Parsippany, NJ (US)

(73) Assignee: Apple Inc., Cupertino, CA (US)

( * ) Notice: Subject to any disclaimer, the term of this patent is extended or adjusted under 35 U.S.C. 154(b) by 4 days.

(21) Appl. No.: 17/951,943

(22) Filed: Sep. 23, 2022

(65) Prior Publication Data

US 2023/0101617 A1 Mar. 30, 2023

Related U.S. Application Data (60) Provisional application No. 63/248,304, filed on Sep. 24, 2021.

(51) Int. Cl.
| | |
|---|---|
| *G06T 19/20* | (2011.01) |
| *G06T 11/00* | (2006.01) |
| *G06T 17/20* | (2006.01) |
| *G06V 40/10* | (2022.01) |

(52) U.S. Cl.
CPC ............ *G06V 40/103* (2022.01); *G06T 11/00* (2013.01); *G06T 17/20* (2013.01); *G06T 19/20* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 2021/0049811 A1* | 2/2021 | Fedyukov | G06T 7/60 |
| 2021/0150806 A1* | 5/2021 | Guler | G06T 13/40 |
| 2022/0189113 A1* | 6/2022 | Seo | G06T 7/55 |
| 2023/0306054 A1* | 9/2023 | Yoshida | G06F 16/532 |

OTHER PUBLICATIONS

Zerong Zheng et al, "HybridFusion: Real-time performance capture using a single depth sensor and sparse IMUs". The European Conference on Computer Vision (ECCV), 2018, part 9, pp. 389-406, DOI: 10.1007/978-3-030-01240-3_24 (Year: 2018).*
Newell et al., "Stacked Hourglass Networks for Human Pose Estimation," CoRR, Submitted on Mar. 22, 2016, arXiv: 1603.06937, 17 pages.

* cited by examiner

*Primary Examiner* — Tize Ma
(74) *Attorney, Agent, or Firm* — Fish & Richardson P.C.

(57) ABSTRACT

Embodiments are disclosed for full body pose estimation using features extracted from multiple wearable devices. In an embodiment, a method comprises: obtaining point of view (POV) video data and inertial sensor data from multiple wearable devices worn at the same time by a user; obtaining depth data capturing the user's full body; extracting two-dimensional (2D) keypoints from the POV video data; reconstructing a full body 2D skeletal model from the 2D keypoints; generating a three-dimensional (3D) mesh model of the user's full body based on the depth data; merging nodes of the 3D mesh model with the inertial sensor data; aligning respective orientations of the 2D skeletal model and the 3D mesh model in a common reference frame; and predicting, using a machine learning model, classification types based on the aligned 2D skeletal model and 3D mesh model.

8 Claims, 6 Drawing Sheets

FULL BODY POSE ESTIMATION THROUGH FEATURE EXTRACTION FROM MULTIPLE WEARABLE DEVICES

CROSS-REFERENCE TO RELATED APPLICATION

This application claims priority to U.S. Provisional Patent Application No. 63/248,304, filed Sep. 24, 2021, the entire contents of which are incorporated herein by reference.

TECHNICAL FIELD

This disclosure relates generally to full body pose estimation.

BACKGROUND

Wearable devices are now prevalent in society. Many consumers wear both smartwatches and ear devices on a daily basis. Many of these wearable devices include inertial sensors that can sense the motion of the user. For example, inertial sensors embedded in a smartwatch can capture a user's arm motion which can then be used by a fitness application to compute various fitness metrics, such as the amount of calories burned by the user during exercise. Some ear devices (e.g., earbuds) include inertial sensors that control audio playback, provide microphone orientation data used in beamforming to reduce background noise, and head tracking for anchoring a spatial audio sound field played through the ear devices.

SUMMARY

Embodiments are disclosed for full body pose estimation through feature extraction from multiple wearable devices.

In an embodiment, a method comprises: obtaining, with at least one processor, point of view (POV) video data and inertial sensor data from multiple wearable devices worn at the same time by a user; obtaining, with the at least one processor, depth data capturing the user's full body; extracting, with the at least one processor, two-dimensional (2D) keypoints from the POV video data; reconstructing, with the at least one processor, a full body 2D skeletal model from the 2D keypoints; generating, with the at least one processor, a three-dimensional (3D) mesh model of the user's full body based on the depth data; merging, with the at least one processor, nodes of the 3D mesh model with the inertial sensor data; aligning, with the at least one processor, respective orientations of the 2D skeletal model and the 3D mesh model in a common reference frame; and predicting, using a machine learning model, classification types based on the aligned 2D skeletal model and 3D mesh model.

In an embodiment, at least one wearable device is a headset worn on or in the ears of the user and at least one wearable device is smartwatch worn on a wrist of the user.

In an embodiment, the method is performed by a central computing device that is wireless coupled to the wearable devices.

In an embodiment, altimeter data obtained from the multiple wearable devices is used to align respective orientations of the 2D skeletal model and the 3D mesh model in the common reference frame.

Other embodiments can include an apparatus, computing device and non-transitory, computer-readable storage medium.

Particular embodiments disclosed herein provide one or more of the following advantages. The disclosed embodiments provide a more accurate full body skeletal model that can provide detailed insights into a user's movements, allowing improved progress tracking for various fitness activities or health monitoring. For example, a user can be provided a workout summary on their smartphone or smartwatch that includes repetition data for various exercises (e.g., number of weighted squats or pushups), and trend data such as range of motion improvements.

An additional advantage is that existing devices already owned by the user (e.g., smartphone, smartwatch, earbuds) can be used in combination with inexpensive compact sensor modules (inertial sensors, altimeter and camera) that can easily attached to different locations of the user's body or clothing to create a distributed sensing system. Using multiple cameras and inertial sensors placed at different locations of the user's body, combined with depth data for the full body allows for a more accurate three-dimensional skeletal model to be generated.

The disclosed embodiments can be used in a variety of applications such as applications that detect if a person has fallen down or is sick, applications that autonomously teach proper workout regimes, sport techniques and dance activities, applications that can understand full-body sign language. (e.g., Airport runway signals, traffic policemen signals, etc.), applications that can enhance security and surveillance, work from home ergonomic applications and any other applications that could benefit from full body pose estimation.

The details of one or more implementations of the subject matter are set forth in the accompanying drawings and the description below. Other features, aspects and advantages of the subject matter will become apparent from the description, the drawings and the claims.

DETAILED DESCRIPTION

System Overview

Figure 1:
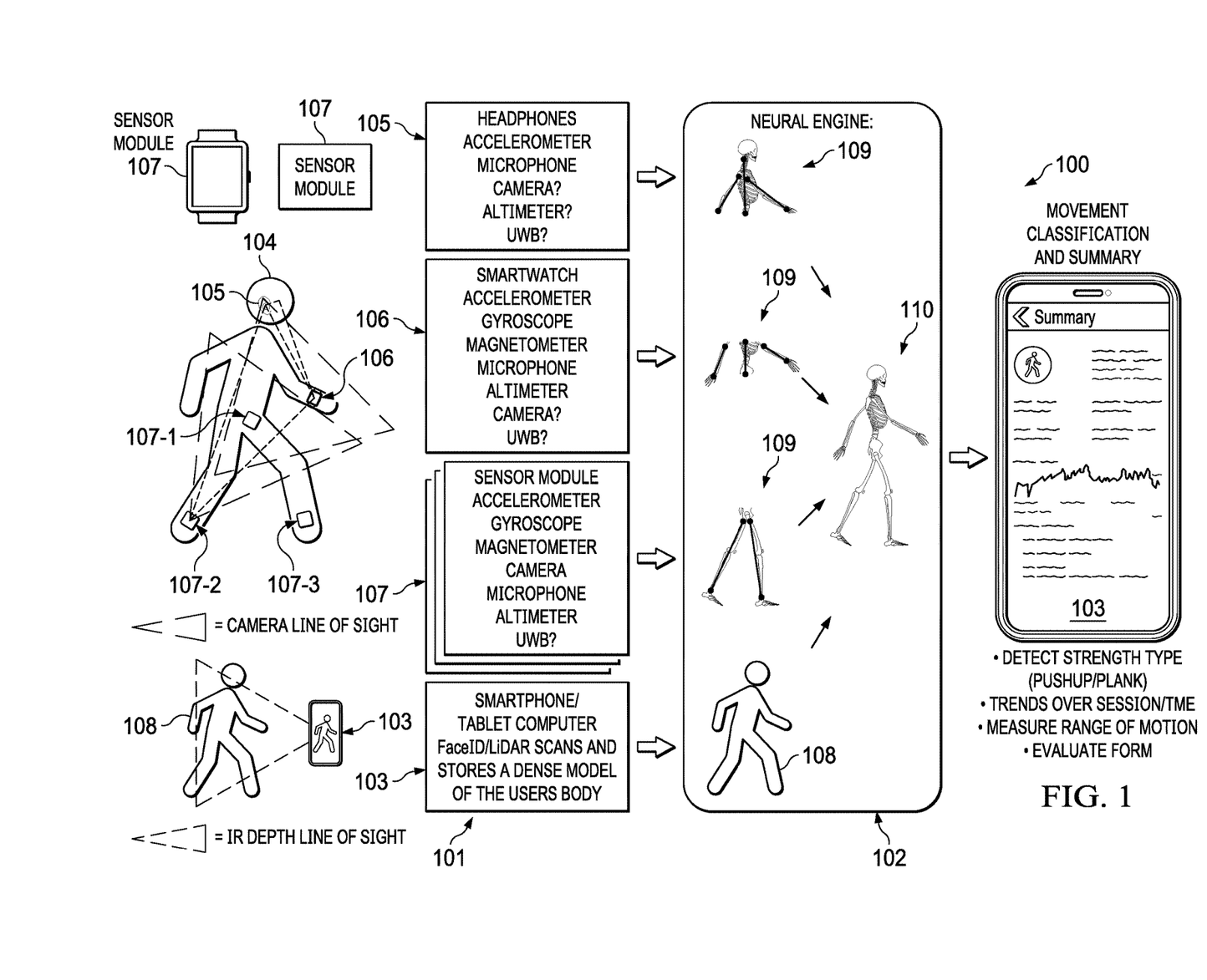
FIG. 1 is a block diagram of a system for full body pose estimation through features extracted from multiple wearable devices, according to an embodiment.

FIG. 1 is a block diagram of a system 100 for full body pose estimation through features extracted from multiple wearable devices, according to an embodiment. System 100 includes wearable devices 101, neural engine 102 and central computing device 103. User 104 is shown wearing a number of wearable devices on their body, including headset 105, smartwatch 106 and sensor modules 107. Each of these devices 101 includes a core processor, memory, inertial sensors (e.g., accelerometers, gyroscopes), an altimeter (e.g., barometric sensor), a video camera and a power source (e.g., a battery). Headset 105 includes left and right ear pieces, one or both of which include at least one core processor, memory, accelerometer, altimeter, microphone, video camera and a wireless transceiver. Similarly, smartwatch 106 can include at least one core processor, memory, accelerometer, gyroscope, magnetometer, altimeter, video camera and wireless transceiver. An example software/hardware architecture 500 for smartwatch 106 is described with reference to FIG. 5.

Sensor module 107 can be a compact, low cost dedicated sensing device that includes at least one accelerometer, gyroscope, magnetometer, microphone, altimeter, video camera and wireless transceiver. Sensor module 107 can include various different attachment mechanisms (e.g., clip, adjustable Velcro strap, adhesive) for attaching to a body part (e.g., wrist, ankle) or to clothing (e.g., a shirt, pants) or to accessories (e.g., shoes, belt, headband, hat, glasses). The example configuration shown in FIG. 1 includes three sensor modules 107-1, 107-2, 107-3, where sensor module 107-1 is attached to the user's waist (e.g., clipped to a belt or pants) and sensor modules 107-2, 107-3 are attached to the left and right shoes of user 104, respectively (e.g., clipped to shoe laces).

Central computing device 103 can be a smartphone, tablet computer, notebook computer or any other device that can be wirelessly coupled to wearable devices 101 simultaneously to receive motion sensor and video data from wearable devices 101, and sufficient computing power to perform the full body pose estimation described below. In addition to at least one core processor, memory and a wireless transceiver, central computing device 103 includes a full suite of inertial sensors, altimeter, magnetometer, a video camera and at least one depth sensor, such as a time-of-flight (TOF) camera/sensor or light detection and ranging (LiDAR) sensor that can be used to capture and store a point cloud of the users full body. Central computing device 103 also includes at least one display for displaying application data, such as a movement classification and fitness summary as shown in FIG. 1. An example software/hardware architecture 500 for central computing device 103 is described with reference to FIG. 5.

During a fitness activity, at least one video camera of each wearable device 101 captures a point-of-view (POV) video of a portion of user 104. Some example POVs are illustrated in FIG. 1 by triangles. For example, a video camera in headset 105 is directed down toward the user's feet to capture video of the user's lower body movement. Similarly, video cameras in sensor modules 107-2, 107-3 are directed upwards towards the user's head to capture video of the user's upper body movement. Thus, each wearable device 101 includes a video camera that captures video of the user's body (e.g., legs, arms, torso, head) from a different POV during a fitness activity, such that the video data collectively captures the full body pose of the user.

In an embodiment, each particular wearable device 101 performs a feature extraction process that extracts 2D joint positions (also called "keypoints") from the video data and sends the 2D keypoints to central computing device 103 through short-range wireless communication channels (e.g., Bluetooth channels). The keypoints can be represented in a camera reference frame. The video frames can be marked with a timecode generated from a common timing source at each of the wearable devices 101, such as Global Positioning System (GPS) timing signals, or a network time protocol (NTP) signal provided by the central computing device 103, to allow syncing of the keypoint data from the wearable devices 101 by central computing device 103. The keypoint extractions can be performed in the individual camera reference frames and rotated to a common camera reference frame by central computing device 103 before processing of the video by neural engine 102.

Figure 3A:
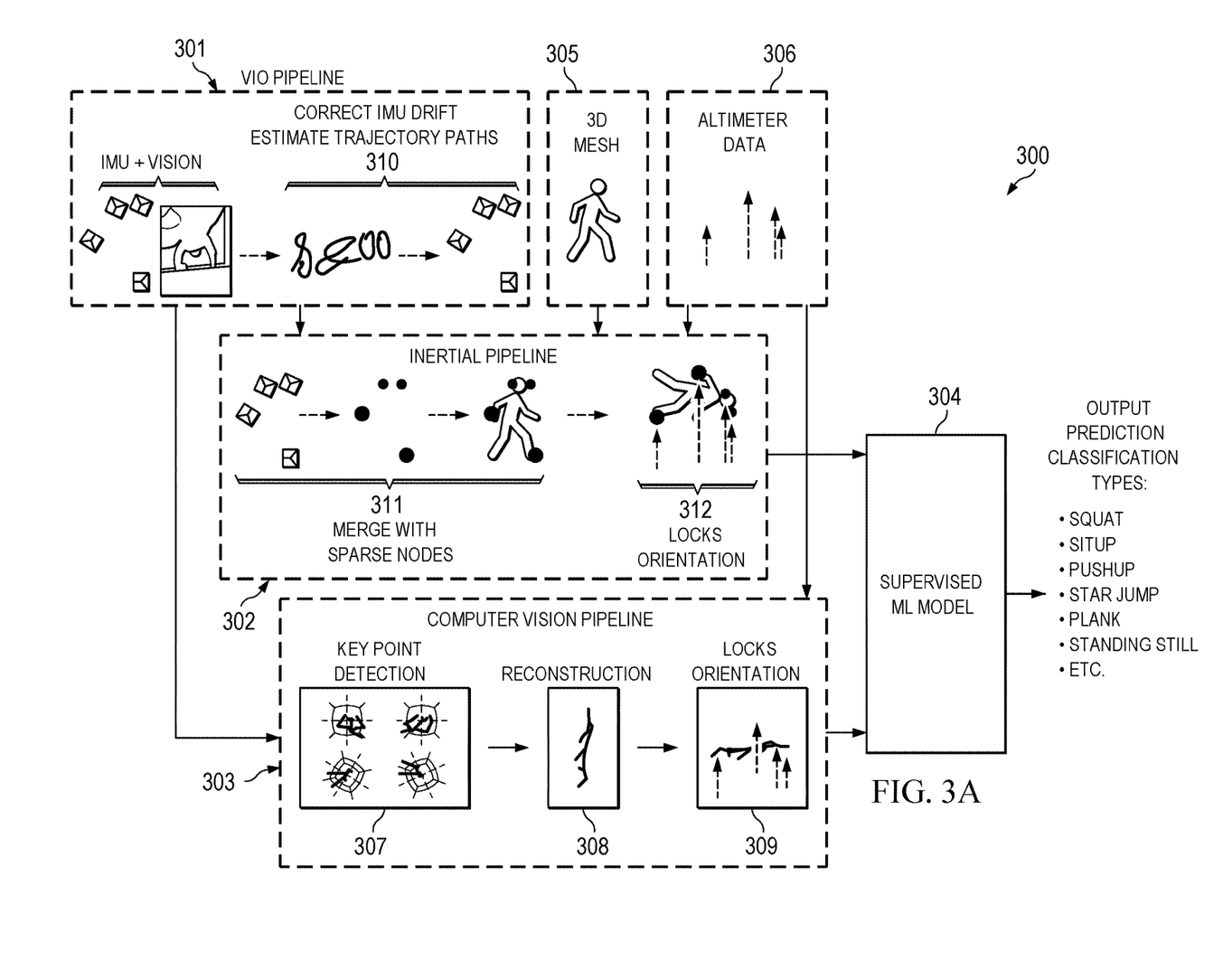
FIG. 3A is a block diagram of a system for full body pose estimation using features extracted from multiple wearable devices, according to an embodiment.

In an embodiment, neural engine 102 reconstructs 2D full body skeletal model 110 from the 2D keypoints extracted from the POV video data, merges the inertial sensor data with nodes (e.g., spare nodes) of 3D mesh model 108 (e.g., generated from depth data provided by a TOF sensor of central computing device 103), aligns the respective orientations of 2D full body skeletal model 110 and 3D mesh model 108 in a common reference frame and predicts classification types using a machine learning (ML) model (e.g., deep learning network) based on 2D full body skeletal model 110 and 3D mesh model 108, as described more fully in reference to FIG. 3A.

Figure 2:
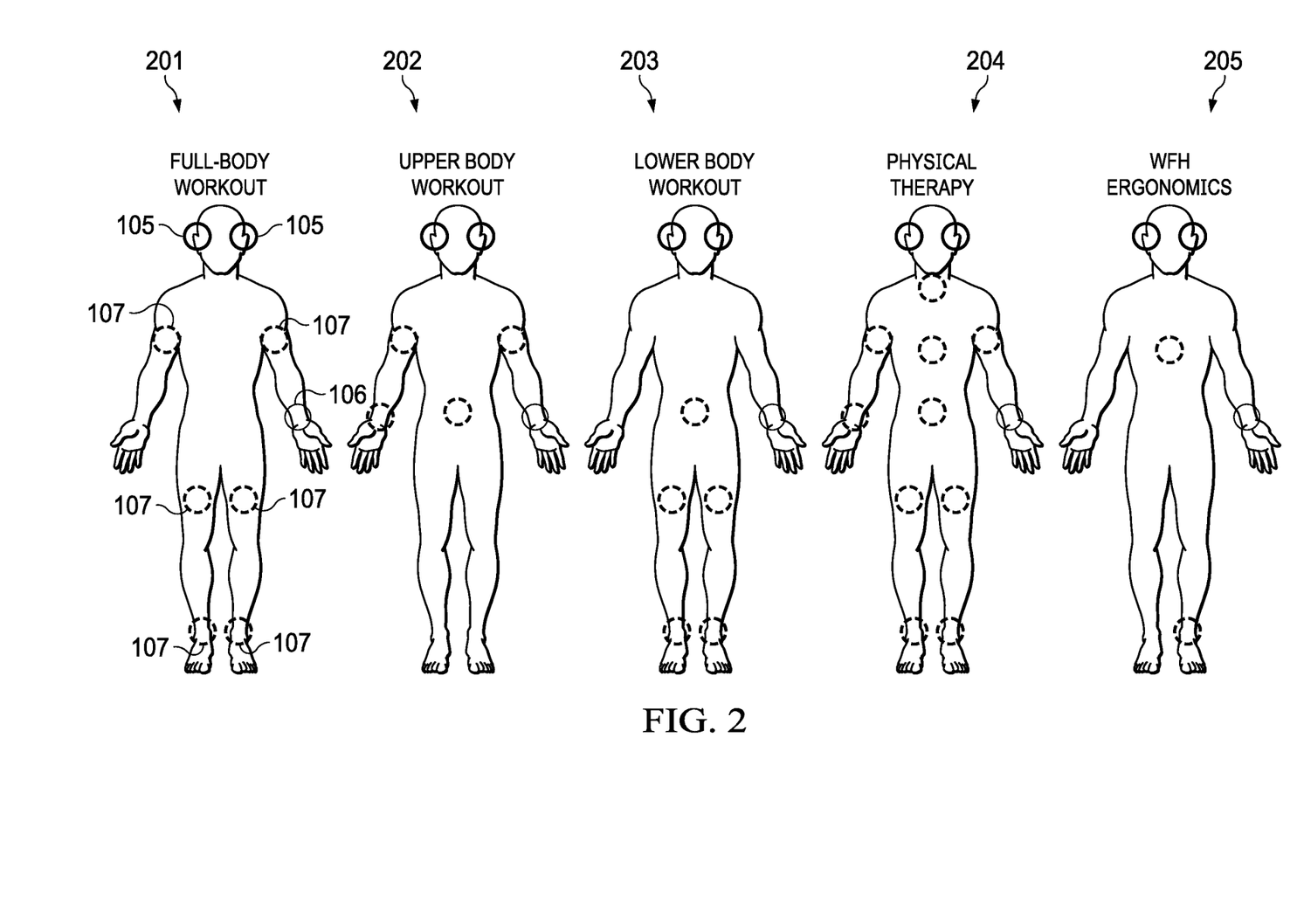
FIG. 2 shows various locations of wearable devices for various types of workouts, according to an embodiment.

FIG. 2 shows various example configurations of wearable devices 101 for various types of workouts, according to an embodiment. Example configuration 201 is used to capture a full body workout and includes headset 105 ear pieces inserted in the user's ear canals, smartwatch 106 strapped on the user's wrist and sensor modules 107 strapped to the user's shoes/ankles, knees and elbows. Other example configurations are also applicable such as a configuration that uses a headset, a smartwatch and a single sensor module attached to one foot of the user. Also, sensor modules 107 may or may not include an IMU or altimeter.

Example configuration 202 is used to capture an upper body workout and includes headset 105 ear pieces inserted in the user's ear canals, smartwatch 106 strapped on the user's wrist and sensor modules 107 strapped to the user's other wrist, elbows and waist as shown.

Example configuration 203 is used to capture a lower body workout and includes headset 105 ear pieces inserted in the user's ear canals, smartwatch 106 strapped on the user's wrist and sensor modules 107 strapped to the user's shoes/ankles, knees and waist as shown.

Example configuration 204 is used for physical therapy and includes headset 105 ear pieces inserted in the user's ear canals, smartwatch 106 strapped on the user's wrist and sensor modules 107 strapped to the user's shoes/ankles, knees, other wrist, waist, chest and neck as shown.

Example configuration 205 is used for ergonomics and includes headset 105 ear pieces inserted in the user's ear canals, smartwatch 106 strapped on the user's wrist and sensor modules 107 strapped to the user's chest and one shoe/ankle as shown.

FIG. 3A is a block diagram of a system 300 for full body pose estimation using features extracted from multiple wearable devices 101, according to an embodiment. System 300 includes visual-inertial odometry (VIO) processing pipeline 301, inertial pipeline 302, computer vision pipeline 303 and supervised ML model 304.

VIO processing pipeline 301 receives motion data (e.g., acceleration, rotation rate) from inertial measurement units (IMUs) of wearable devices (hereinafter also referred to as "IMU data"), altimeter data and video data from video cameras of wearable devices over wireless communication channels (e.g., Bluetooth channel), corrects for IMU drift 310 (e.g., due to drift error in accelerometers and gyroscope sensors) and estimates trajectories of the wearable devices (e.g., their position in a world coordinate frame) based on the IMU data sampled for each measurement epoch (e.g., every 0.2 seconds).

Inertial processing pipeline 302 receives the trajectories, 3D mesh model 305 and altimeter data 306 from altimeters embedded in wearable devices 101 (e.g., a barometer). 3D mesh model 305 can be generated from depth data captured by a depth sensor (e.g., TOF sensor LiDAR) of a central computing device 103. Using these inputs, inertial processing pipeline 301 merges the trajectories of wearable devices 101 with nodes of 3D mesh model (311) (e.g., merge with sparse nodes), and determines the orientation of 3D mesh model (312) with respect to ground based on altimeter data 306. For example, if the height of a smart watch 106 is about the same height as sensor modules 107-2, 107-3, and all three heights are close to the ground it could be assumed that the user is in a prone or supine position.

Computer vision processing pipeline 303 receives video data from VIO processing pipeline 301, performs keypoint detection 307 (e.g., determining 2D joint positions) to create a 2D skeletal model for each POV video data received from each wearable device, performs reconstruction 308 of a 2D full body skeletal model 312, and determines the orientation of the 2D skeletal model with respect to ground 309 using altimeter data 306.

In an embodiment, keypoint detection 307 can be implemented using the techniques described in Newell, A., Yang, K., & Deng, J. (2016). Stacked Hourglass Networks for Human Pose Estimation. ECCV, or the publicly available OpenPose library. The OpenPose library provides a set of JavaScript Object Notation (JSON) files relative to keypoints detected in each video frame, and a video where the detected postures are presented in each frame of the same.

The outputs of inertial processing pipeline 302 and computer vision processing pipeline 303 are 3D mesh model 305 and 2D full body skeletal model 312, respectively, where the orientation of 3D mesh model 305 (with the merged inertial sensor data) and 2D full body skeletal model 312 are aligned in a common reference frame. The outputs are input into supervised ML model 304 (e.g., a deep learning network) that is trained, e.g., as described in reference to FIG. 3B, to predict classification types and associated confidence scores for various exercises, such as squats, sit-ups, pushups, star jumps, plank, standing still, etc. The confidence scores can be percentage probabilities that the predicted classification type is correct.

In an embodiment where depth data is not available, 2D full body skeletal model 312 can be lifted into a 3D full body skeletal model using a 2D-3D lifting network and the inertial sensor data can be merged with nodes of 3D skeletal model. The 3D skeletal model 312 can then be used as input into ML model 304 trained on synthetic poses of a 3D skeletal model.

Figure 3B:
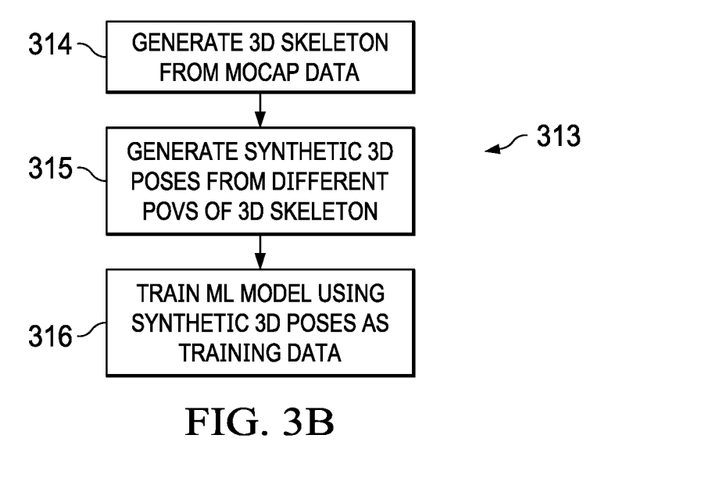
FIG. 3B is flow diagram of a training process for a machine learning (ML) model for full body pose estimation using features extracted from multiple wearable devices, according to an embodiment.

FIG. 3B is flow diagram of a training process 313 for a machine learning (ML) model 304 for full body pose estimation, according to an embodiment. In an embodiment, a 2D skeletal model is generated 314 using motion capture (MoCap) data. Any known technique can be used to generate a 2D skeletal model from MoCap data. Next, training process 313 used the 2D skeletal model to generate synthetic 2D body poses from different points of view (POVs) (315). Additionally, a 3D mesh model of a human skeleton is generated using any known technique and used to generate synthetic 3D body poses from different POVs. Training process 313 then trains ML model 304 using corresponding pairs of the synthetic 2D and 3D poses as training data (316) using known neural network training techniques (e.g., back propagation). ML model 304 can then be used by neural engine 102 in a deployment scenario to predict classification types.

Example Process

Figure 4:
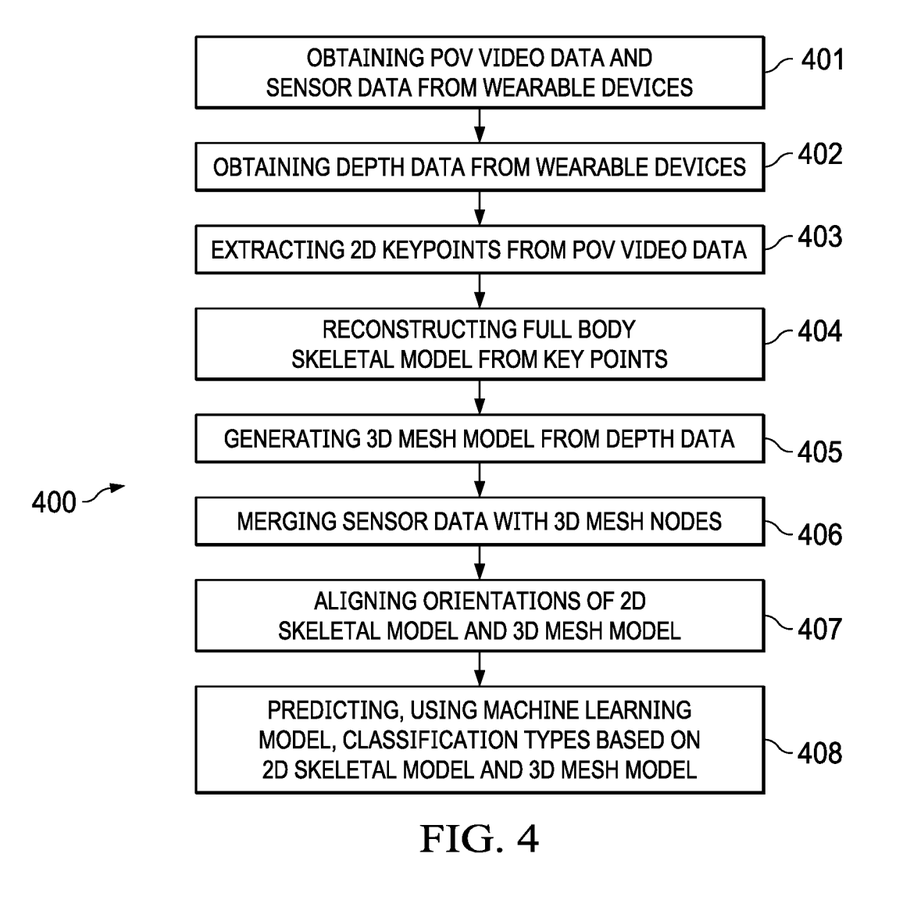
FIG. 4 is a flow diagram of a process of full body pose estimation using features extracted from multiple wearable devices, according to an embodiment.

FIG. 4 is a flow diagram of a process 400 of full body pose estimation using features extracted from multiple wearable devices attached to a user's body, according to an embodiment. Process 400 can be implemented using the software/hardware architectures described in reference to FIGS. 5 and 6.

In an embodiment, process 400 begins by obtaining point of view (POV) video data and inertial sensor data from multiple wearable devices (e.g., headset, smartwatch, sensor modules) worn at the same time by a user (401), and obtaining depth data of the user's full body (402). For example, a TOF camera of a central computing device (e.g., a smartphone) can be used to capture a point cloud of the user's full body, and convert the point cloud into a 3D mesh using any suitable know 3D mesh technique.

Process 400 continues by extracting two-dimensional (2D) keypoints from the POV video data (403) and reconstructing a 2D full body skeletal model from the 2D keypoints (404). For example, joint locations for portions (e.g., upper body joint locations, lower body joint positions, etc.) of a full skeletal model can be combined into a single 2D full body skeletal model. In an embodiment, metadata transmitted with POV video data includes orientation data (e.g., roll, pitch, yaw) of the wearable device in a local body frame. Each POV video data is rotated into a common reference frame using the orientation data and altimeter data before reconstructing the 2D full body skeletal model.

Process 400 continues by generating a three-dimensional (3D) mesh model of the user's full body based on the depth data (405) and merging nodes of the 3D mesh model with the inertial sensor data (406). For example, an suitable surface reconstruction technique (e.g., Poisson surface reconstruction, global or local fitting) can be use to generate a 3D mesh model from a point cloud.

Process 400 continues by aligning respective orientations of the 2D skeletal model and the 3D mesh model in a common reference frame (407) and predicting, using a ML model, classification types based on the aligned 2D skeletal model and 3D mesh model (408). For example, altimeter data (e.g., height above ground) received with the inertial sensor data can be used to determine the orientation of the 2D skeletal model and 3D mesh model with respect to ground. The ML model can be a deep learning neural network trained to classify motion types using training data, as described in reference to FIG. 3B.

Example Software/Hardware Architectures

Figure 5:
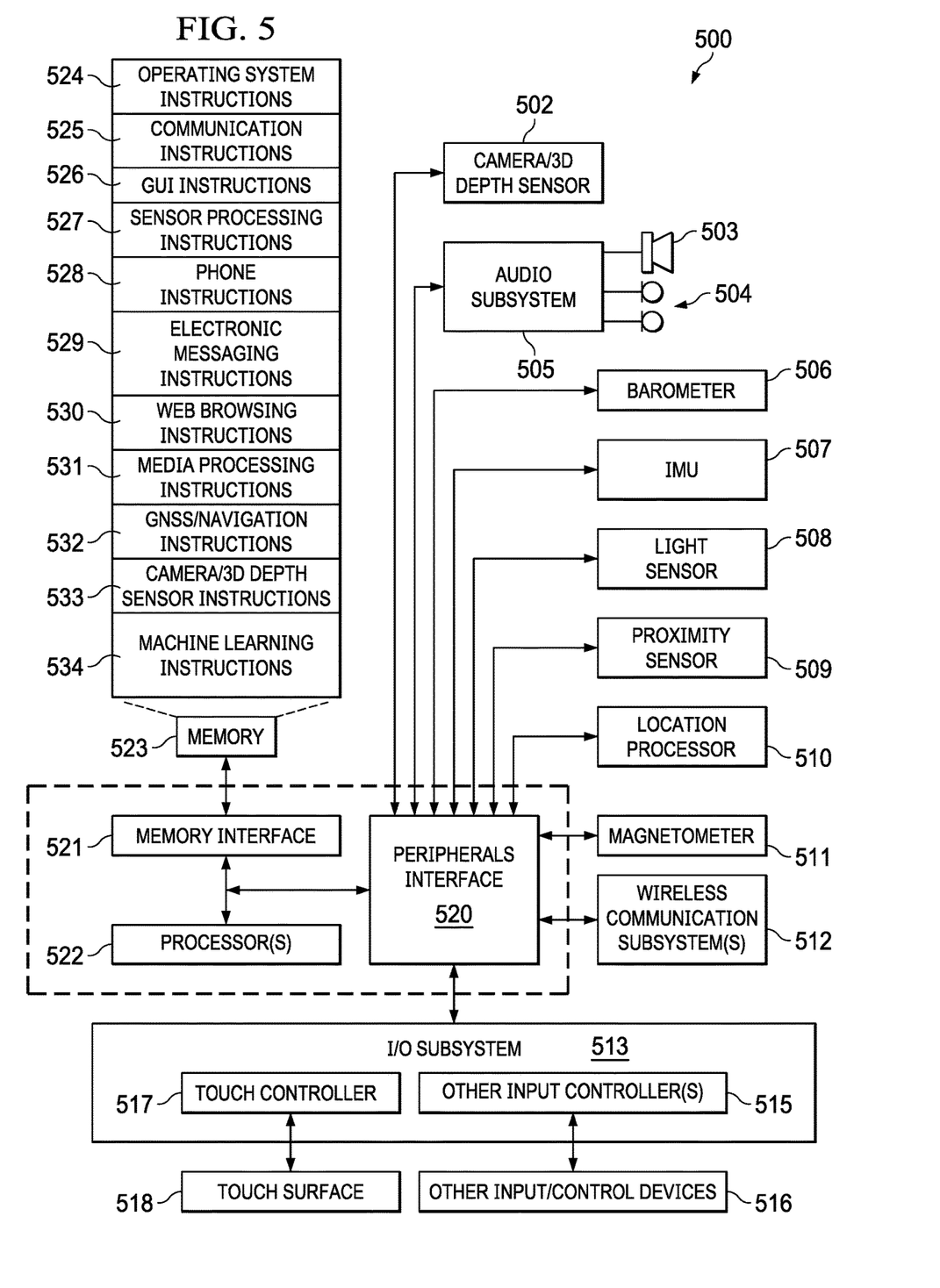
FIG. 5 is a conceptual block diagram of a device software/hardware architecture implementing at least one of the features and operations described in reference to FIGS. 1-4.

FIG. 5 is a conceptual block diagram of device software/hardware architecture 500 implementing the features and operations described in reference to FIGS. 1-4. Architecture 500 can include memory interface 521, one or more data processors, digital signal processors (DSPs), image processors and/or central processing units (CPUs) 504 and peripherals interface 506. Memory interface 521, one or more processors 522 and/or peripherals interface 520 can be separate components or can be integrated in one or more integrated circuits.

Sensors, devices and subsystems can be coupled to peripherals interface 520 to provide multiple functionalities. For example, one or more motion sensors 507, light sensor 508 and proximity sensor 509 can be coupled to peripherals interface 520 to facilitate motion sensing (e.g., acceleration, rotation rates), lighting and proximity functions of the wearable computer. Location processor 510 can be connected to peripherals interface 520 to provide geo-positioning. In some implementations, location processor 510 can be a GNSS receiver, such as the Global Positioning System (GPS) receiver. Electronic magnetometer 511 (e.g., an integrated circuit chip) can also be connected to peripherals interface 520 to provide data that can be used to determine the direction of magnetic North. Electronic magnetometer 511 can provide data to an electronic compass application. Motion sensor(s) 507 can be an IMU that includes one or more accelerometers and/or gyros (e.g., 3-axis MEMS accelerometer and 3-axis MEMS gyro) configured to determine change of speed and direction of movement of the source device. Barometer 506 can be configured to measure atmospheric pressure around the mobile device.

Camera/3D depth sensor 502 captures digital images and video and can include both forward-facing and rear-facing cameras. The 3D depth sensor can be any sensor capable of capturing 3D data or point clouds, such as a time of flight (TOF) camera/sensor or LiDAR sensor.

Communication functions can be facilitated through wireless communication subsystems 512, which can include radio frequency (RF) receivers and transmitters (or transceivers) and/or optical (e.g., infrared) receivers and transmitters. The specific design and implementation of the wireless communication subsystem 512 can depend on the communication network(s) over which a mobile device is intended to operate. For example, architecture 500 can include communication subsystems 524 designed to operate over a GSM network, a GPRS network, an EDGE network, a Wi-Fi™ network and a Bluetooth™ network. In particular, the wireless communication subsystems 512 can include hosting protocols, such that the mobile device can be configured as a base station for other wireless devices.

Audio subsystem 505 can be coupled to a speaker 503 and one or more microphones 504 to facilitate voice-enabled functions, such as voice recognition, voice replication, digital recording and telephony functions. Audio subsystem 505 can be configured to receive voice commands from the user.

I/O subsystem 513 can include touch surface controller 517 and/or other input controller(s) 515. Touch surface controller 517 can be coupled to a touch surface 518. Touch surface 518 and touch surface controller 517 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 546. Touch surface 518 can include, for example, a touch screen or the digital crown of a smart watch. I/O subsystem 513 can include a haptic engine or device for providing haptic feedback (e.g., vibration) in response to commands from processor 522 or a digital signal processor (DSP). In an embodiment, touch surface 518 can be a pressure-sensitive surface.

Other input controller(s) 544 can be coupled to other input/control devices 548, such as one or more buttons, rocker switches, thumb-wheel, infrared port and USB port. The one or more buttons (not shown) can include an up/down button for volume control of speaker 503 and/or microphones 504. Touch surface 518 or other input control devices 516 (e.g., a button) can include, or be coupled to, fingerprint identification circuitry for use with a fingerprint authentication application to authenticate a user based on their fingerprint(s).

In one implementation, a pressing of the button for a first duration may disengage a lock of the touch surface 518; and a pressing of the button for a second duration that is longer than the first duration may turn power to the mobile device on or off. The user may be able to customize a functionality of one or more of the buttons. The touch surface 518 can, for example, also be used to implement virtual or soft buttons.

In some implementations, the mobile device can present recorded audio and/or video files, such as MP3, AAC and MPEG files. In some implementations, the mobile device can include the functionality of an MP 3 player. Other input/output and control devices can also be used.

Memory interface 521 can be coupled to memory 523. Memory 523 can include high-speed random access memory and/or non-volatile memory, such as one or more magnetic disk storage devices, one or more optical storage devices and/or flash memory (e.g., NAND, NOR). Memory 550 can store operating system 524, such as the iOS operating system developed by Apple Inc. of Cupertino, California. Operating system 552 may include instructions for handling basic system services and for performing hardware dependent tasks. In some implementations, operating system 524 can include a kernel (e.g., UNIX kernel).

Memory 523 may also store communication instructions 525 to facilitate communicating with one or more additional devices, one or more computers and/or one or more servers, such as, for example, instructions for implementing a software stack for wired or wireless communications with other devices. Memory 523 may include graphical user interface instructions 526 to facilitate graphic user interface processing; sensor processing instructions 527 to facilitate sensor-related processing and functions; phone instructions 528 to facilitate phone-related processes and functions; electronic messaging instructions 529 to facilitate electronic-messaging related processes and functions; web browsing instructions 530 to facilitate web browsing-related processes and functions; media processing instructions 531 to facilitate media processing-related processes and functions; GNSS/Location instructions 532 to facilitate generic GNSS and location-related processes; and camera/3D depth sensor instructions 533 for capturing images (e.g., video, still images) and depth data (e.g., a point cloud). Memory 523 further includes spatial audio instructions 534 for use in spatial audio applications, including head pose tracking instructions and posture transition determination instructions for implementing the features described in reference to FIGS. 1-4.

Each of the above identified instructions and applications can correspond to a set of instructions for performing one or more functions described above. These instructions need not be implemented as separate software programs, procedures, or modules. Memory 23 can include additional instructions or fewer instructions. Furthermore, various functions of the mobile device may be implemented in hardware and/or in software, including in one or more signal processing and/or application specific integrated circuits.

Figure 6:
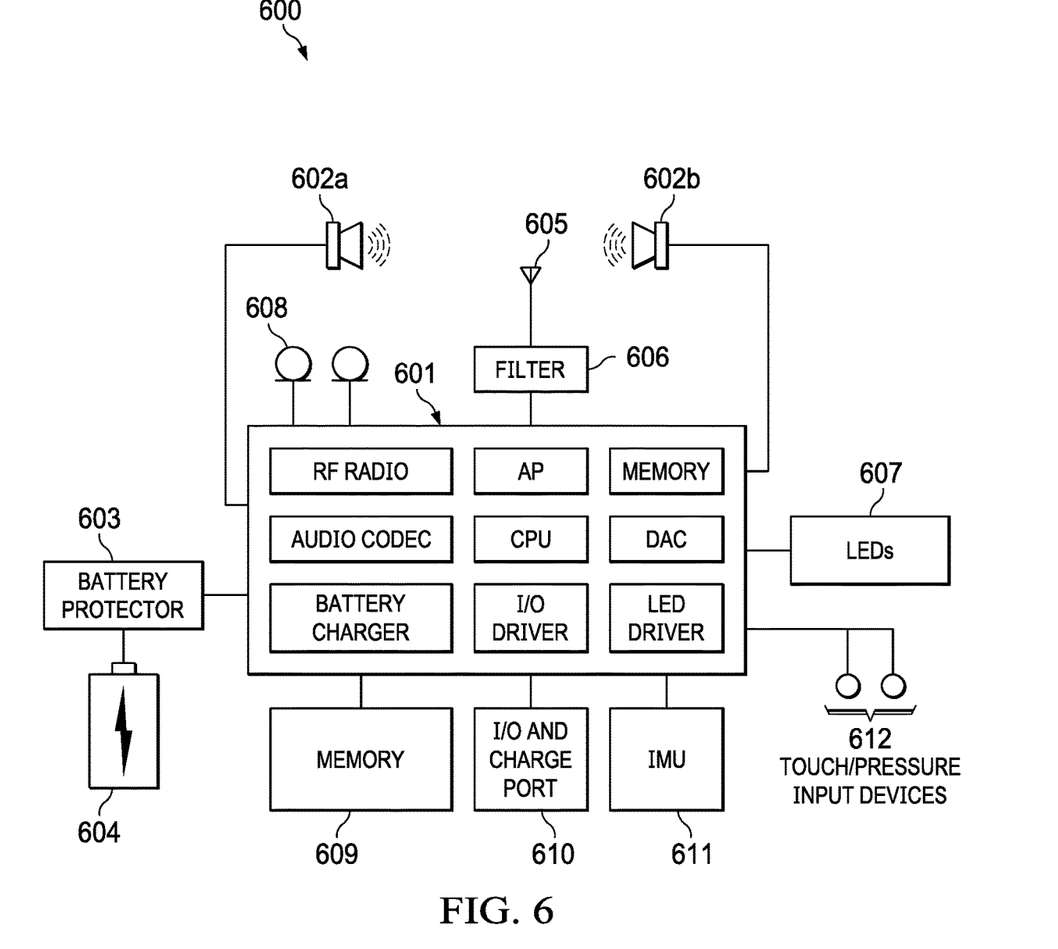
FIG. 6 is a conceptual block diagram of a headset software/hardware architecture implementing at least one of the features and operations described in reference to FIGS. 1-4.

FIG. 6 is a conceptual block diagram of headset software/hardware architecture 600 implementing the features and operations described in reference to FIGS. 1-4. In an embodiment, architecture 600 can includes system-on-chip (SoC) 601, stereo loudspeakers 602 a, 602b (e.g., ear buds, headphones, ear phones), battery protector 603, rechargeable battery 604, antenna 605, filter 606, LEDs 607, microphones 608, memory 609 (e.g., flash memory), I/O/Charge port 610, IMU 611 and pushbuttons 612 (or touch sensors, pressure sensors) for turning the headset on and off, adjusting volume, muting, etc. IMU 611 was previously described in reference to FIGS. 1-4, and includes, for example, a 3-axis MEMS gyro and a 3-axis MEMS accelerometer. SoC 601 can be included in one or both left and right wireless ear pierces comprising headset 600.

SoC 601 further includes various modules, such as a radio frequency (RF) radio (wireless transceiver) for wireless bi-directional communication with other devices, such as a smartphone, as described in reference to FIGS. 1-4. SoC 601 further includes an application processor (AP) for running specific applications, memory (e.g., flash memory), central processing unit (CPU) for managing various functions of the headsets, audio codec for encoding/decoding audio, battery charger for charging/recharging rechargeable battery 604, I/O driver for driving I/O and charge port (e.g., a micro USB port), digital to analog converter (DAC) converting digital audio into analog audio and LED driver for driving LEDs 607. Other embodiments can have more or fewer components.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., SWIFT, Objective-C, C#, Java), including compiled or interpreted languages, and it can be deployed in any form, including as a stand-alone program or as a module, component, subroutine, a browser-based web application, or other unit suitable for use in a computing environment.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A method comprising:
   training, with at least one processor, a machine learning model to predict classification types and associated confidence scores for various exercises;
   obtaining, with the at least one processor, point of view (POV) video data and inertial sensor data from multiple wearable devices worn at the same time by a user;
   obtaining, with the at least one processor, depth data capturing the user's full body;
   extracting, with the at least one processor, two-dimensional (2D) keypoints from the POV video data;
   reconstructing, with the at least one processor, a full body 2D skeletal model from the 2D keypoints;
   generating, with the at least one processor, a three-dimensional (3D) mesh model of the user's full body based on the depth data;

merging, with the at least one processor, nodes of the 3D mesh model with the inertial sensor data;

aligning, with the at least one processor, respective orientations of the 2D skeletal model and the 3D mesh model in a common reference frame; and predicting, using the trained machine learning model, classification types and associated confidence scores for various exercises based on the aligned 2D skeletal model and 3D mesh model.

2. The method of claim 1, wherein at least one wearable device is a headset worn on or in the ears of the user and at least one wearable device is smartwatch worn on a wrist of the user.

3. The method of claim 1, wherein the method is performed by a central computing device that is wireless coupled to the multiple wearable devices.

4. The method of claim 1, wherein altimeter data obtained from the multiple wearable devices is used to align respective orientations of the 2D skeletal model and the 3D mesh model in the common reference frame.

5. A system comprising:
multiple wearable devices;
at least one processor;
memory storing instructions that when executed by the at least one processor, causes the at least one processor to perform operations comprising:
 obtain point of view (POV) video data and inertial sensor data from the multiple wearable devices worn at the same time by a user;
 obtain depth data capturing the user's full body;
 extracting two-dimensional (2D) keypoints from the POV video data;
 reconstruct a full body 2D skeletal model from the 2D keypoints;
 generate a three-dimensional (3D) mesh model of the user's full body based on the depth data;
 merge nodes of the 3D mesh model with the inertial sensor data;
 align respective orientations of the 2D skeletal model and the 3D mesh model in a common reference frame; and
 predict, using a machine learning model, classification types and associated confidence scores for various exercises based on the aligned 2D skeletal model and 3D mesh model, wherein the machine learning model is trained to predict classification types and associated confidence scores for various exercises.

6. The system of claim 5, wherein at least one wearable device is a headset worn on or in the ears of the user and at least one wearable device is smartwatch worn on a wrist of the user.

7. The system of claim 5, wherein the operations are performed by a central computing device that is wireless coupled to the multiple wearable devices.

8. The system of claim 5, wherein altimeter data obtained from the multiple wearable devices is used to align respective orientations of the 2D skeletal model and the 3D mesh model in the common reference frame.

* * * * *